US012681179B2

(12) United States Patent　　　　(10) Patent No.:　US 12,681,179 B2
　　Robinson et al.　　　　　　　　(45) Date of Patent:　　　Jul. 14, 2026

(54) OBJECT TRACKING USING LiDAR DATA FOR AUTONOMOUS MACHINE APPLICATIONS

(71) Applicant: NVIDIA Corporation, Santa Clara, CA (US)

(72) Inventors: Richard Zachary Robinson, Woodinville, WA (US); Jens Christian Bo Joergensen, Flushing, NY (US); David Wehr, Redmond, WA (US); Joachim Pehserl, Lynnwood, WA (US)

(73) Assignee: NVIDIA Corporation, Santa Clara, CA (US)

( * ) Notice: Subject to any disclaimer, the term of this patent is extended or adjusted under 35 U.S.C. 154(b) by 1272 days.

(21) Appl. No.: 17/409,052

(22) Filed: Aug. 23, 2021

(65) Prior Publication Data

US 2023/0054759 A1　　Feb. 23, 2023

(51) Int. Cl.
　　*G01S 17/66*　　　　(2006.01)
　　*B25J 9/16*　　　　(2006.01)
　　　　　　(Continued)

(52) U.S. Cl.
　　CPC ............. *G01S 17/66* (2013.01); *B25J 9/1676* (2013.01); *G01S 17/58* (2013.01); *G01S 17/931* (2020.01);
　　　　　　(Continued)

(58) Field of Classification Search
　　CPC ........ G01S 17/66; G01S 17/58; G01S 17/931; G01S 17/86; G01S 17/89; G01S 17/34;
　　　　　　(Continued)

(56) References Cited

U.S. PATENT DOCUMENTS 5,537,119 A　*　7/1996　Poore, Jr. .............. G01S 13/726
7,792,598 B2 *　9/2010　Khosla ............... G01N 35/0092
　　　　　　(Continued)

FOREIGN PATENT DOCUMENTS

CN　　109784315 A　　5/2019
CN　　110927742 A　　3/2020
　　　　　(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
　　　　　　(Continued)

*Primary Examiner* — Ellis B. Ramirez

(74) *Attorney, Agent, or Firm* — IRON SUMMIT IP LLP

(57)　　　　ABSTRACT

In various examples, an obstacle detector is capable of tracking a velocity state of detected objects or obstacles using LiDAR data. For example, using LiDAR data alone, an iterative closest point (ICP) algorithm may be used to determine a current state of detected objects for a current frame and a Kalman filter may be used to maintain a tracked state of the one or more objects detected over time. The obstacle detector may be configured to estimate velocity for one or more detected objects, compare the estimated velocity to one or more previous tracked states for previously detected objects, determine that the detected objects corresponds to a certain previously detected object, and update the tracked state for the previously detected object with the estimated velocity.

20 Claims, 11 Drawing Sheets

100

(51) Int. Cl.

| | |
|---|---|
| *B60T 7/12* | (2006.01) |
| *B60W 30/09* | (2012.01) |
| *B62D 15/02* | (2006.01) |
| *G01S 17/58* | (2006.01) |
| *G01S 17/931* | (2020.01) |

(52) U.S. Cl.
CPC ............... *B60T 7/12* (2013.01); *B60W 30/09* (2013.01); *B60W 2420/408* (2024.01); *B62D 15/0265* (2013.01)

(58) Field of Classification Search
CPC ...... G01S 7/4808; G01S 7/539; G01S 7/4817; B25J 9/1676; B60T 7/12; B60T 7/22; B60W 30/09; B60W 2420/408; B62D 15/0265
USPC ......... 701/519, 23, 510, 514, 300; 356/4.01; 342/90, 95, 96
See application file for complete search history.

(56) References Cited

U.S. PATENT DOCUMENTS

| | | | | |
|---|---|---|---|---|
| 10,885,698 | B2 | 1/2021 | Muthler et al. | |
| 11,187,793 | B1 * | 11/2021 | Liu | G05D 1/0214 |
| 2007/0096975 | A1 * | 5/2007 | Maskell | G01S 13/723 |
| 2014/0324339 | A1 * | 10/2014 | Adam | G01S 13/726 |
| 2018/0001952 | A1 * | 1/2018 | Rajamani | B62J 45/41 |
| 2019/0138822 | A1 * | 5/2019 | Yao | G01S 17/931 |
| 2020/0182992 | A1 * | 6/2020 | Kellner | G01S 13/589 |
| 2020/0219264 | A1 * | 7/2020 | Brunner | G01S 7/4808 |
| 2020/0309957 | A1 * | 10/2020 | Bhaskaran | G01S 17/86 |
| 2021/0237761 | A1 * | 8/2021 | Das | G06T 7/248 |
| 2022/0128995 | A1 * | 4/2022 | Chen | G05D 1/689 |
| 2022/0153297 | A1 * | 5/2022 | Chen | G01S 17/34 |
| 2022/0194424 | A1 * | 6/2022 | Li | B60W 30/09 |
| 2022/0398851 | A1 * | 12/2022 | Nehmadi | G01S 17/931 |
| 2022/0414920 | A1 * | 12/2022 | Mori | G06V 20/58 |

FOREIGN PATENT DOCUMENTS

| | | |
|---|---|---|
| JP | 2019196994 A | 11/2019 |
| JP | 2020004293 A | 1/2020 |
| JP | 2022552938 A | 12/2022 |
| WO | 2021080844 A1 | 4/2021 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems (E/E/PE, or E/E/PES)," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

Vatavu, A., & Nedevschi, S. (2012, September). Real-time modeling of dynamic environments in traffic scenarios using a stereo-vision system. In 2012 15th International IEEE Conference on Intelligent Transportation Systems (pp. 722-727). IEEE.

Robinson, Richard; First Office Action for Chinese Patent Application No. 202210999789.0, filed Aug. 19, 2022, mailed Apr. 29, 2025, 9 pgs.

Lee, et al.; "Probabilistic Track Initiation Algorithm Using Radar Velocity Information in Heavy Clutter Environments," Proceedings of the 15th European Conference, Sep. 16, 2018, 4 pgs.

Robinson, Zach; First Office Action for Japanese Patent Application No. 2022-095617, filed Jun. 14, 2022, mailed Dec. 19, 2025, 7 pgs.

Robinson, Zach; Second Office Action for Chinese Patent Application No. 202210999789.0, filed Aug. 19, 2022, mailed Dec. 16, 2025, 10 pgs.

* cited by examiner

700

OBJECT TRACKING USING LiDAR DATA FOR AUTONOMOUS MACHINE APPLICATIONS

BACKGROUND

Light detection and ranging (LiDAR) can be used to detect objects with high accuracy. For example, LiDAR sensors measure the return time of a laser (or other source) from the object, and the accumulation of these measurements may be used to generate a three-dimensional (3D) point cloud indicative of objects in a sensory field or field of view of the LiDAR sensor. As such, each sweep of the LiDAR sensor may be used to generate a 3D point cloud that is a single capture in time of the readings from the LiDAR sensor, and subsequent LiDAR sweeps may be separated by a time interval. In one example field of use, LiDAR sensors are used on autonomous or semi-autonomous vehicles and other machine types to detect potential objects that are in proximity to the LiDAR sensor and by extension in proximity to the vehicle or machine. For example, the LiDAR sensors may be used to identify bounding shapes corresponding to objects in an environment at a high level of accuracy. However, because many types of LiDAR sensors do not capture velocity information, bounding shapes generated from LiDAR data usually do not have velocity information. Without velocity information, these bounding shapes are not traditionally used for control of the vehicle. For example, where an object appears at some distance in front of an ego-machine as the ego-machine is moving forward, different actions are likely to be required if the object is moving toward the ego-machine as opposed to if the object is moving away from the ego-machine (e.g., at a same or greater speed than the ego-machine). As such, due to this absence of velocity information, an alternative source of velocity information is traditionally required in order to gather enough information about object movement to make accurate and reliable control decisions.

SUMMARY

Embodiments of the present disclosure relate to object tracking at least partially through LiDAR data for autonomous machine applications, such as autonomous or semi-autonomous vehicles or machines and/or robotic platforms. Systems and methods are disclosed that identify and track objects by estimating velocities and comparing the estimated velocities to one or more tracked object states. Based upon the comparison, a certain tracked object state is identified as corresponding to a particular object and updated with the new estimated velocity data.

In contrast to these conventional approaches, the current systems and methods are capable of tracking a velocity state of detected objects or obstacles using LiDAR data. For example, using LiDAR data alone, an iterative closest point (ICP) algorithm may be used to determine a current state of detected objects for a current frame and a Kalman filter may be used to maintain a tracked state of the one or more objects detected over time. Embodiments of the present disclosure include a system configured to estimate velocity for one or more detected objects, compare the estimated velocity to one or more previous tracked states for previously detected objects, determine that the detected objects corresponds to a certain previously detected object, and update the tracked state for the previously detected object with the estimated velocity. In such an arrangement, during each LiDAR sweep, the system may associate each detected object with detected objects from previous LiDAR sweeps and update known information about those detected objects. The tracked state for each detected object may be represented using a probability distribution function (PDF) as generated using, e.g., a Kalman filter, where the PDF represents a probability of velocities (and/or locations within an environment as determined using the velocities) for the detected object. The tracked states may be refined over time as new data corresponding to subsequent frames are analyzed by the system.

BRIEF DESCRIPTION OF THE DRAWINGS

The present systems and methods for object tracking using LiDAR data for autonomous machine applications are described in detail below with reference to the attached drawing figures, wherein.

DETAILED DESCRIPTION

Figure 1A:
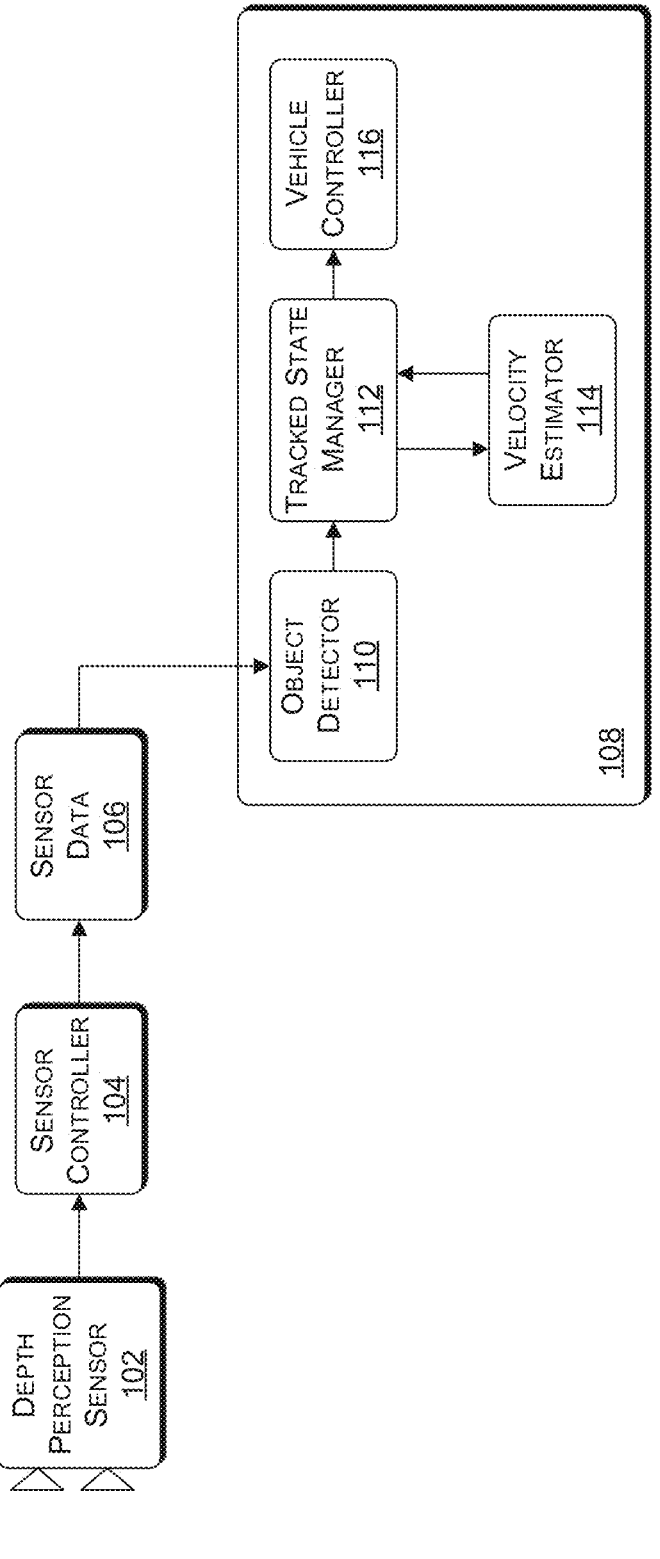
FIG. 1A is a data flow diagram illustrating an object tracking system, in accordance with some embodiments of the present disclosure.

Systems and methods are disclosed related to object tracking through the use of LiDAR data. Although the present disclosure may be described with respect to an example autonomous vehicle 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object tracking through LiDAR data in an autonomous vehicle, this is not intended to be limiting, and the systems and methods described herein may be used in augmented reality, virtual reality, mixed reality, robotics, security and surveillance, autonomous or semi-autonomous machine applications, and/or any other technology spaces where safety applications may be used.

Embodiments of the present disclosure relate to object tracking at least partially through LiDAR data in various applications—such as autonomous or semi-autonomous machine applications. For example, one or more LiDAR sensors may generate 3D LiDAR data representative of their field of view or sensory field—e.g., the LiDAR data may represent a standard spherical projection or other projection type. The LiDAR sensors may continuously generate the LiDAR data such that numerous sets of LiDAR data are generated—each indicative of a single sweep or revolution of the LiDAR sensor. The sets of LiDAR data may be separated by a time interval, and embodiments of the present disclosure may use a first (e.g., current) set of LiDAR data and compare it to a tracked state indicative of one or more prior sets of LiDAR data, as discussed herein.

At an initial state, the system may receive LiDAR data (e.g., in the form of a 3D point cloud) generated using one or more LiDAR sensors associated with an autonomous or semi-autonomous vehicle or other machine. Based upon the LiDAR data, the system may identify one or more objects— e.g., by detecting boundaries within the LiDAR data that correspond to each object. At this initial state, the system may have no information as to which, if any, of the objects are moving (and if so, a speed and direction of such movement). To account for this lack of information, the system may create a velocity tracked state for the objects that is initially empty. During subsequent LiDAR data generation, the system may estimate and refine the velocity tracked state for one or more of the objects detected.

In embodiments of the present disclosure, the system may determine an estimated velocity of an object detected on a subsequent sweep (a "current object detection") based at least in part on a comparison between the current object detection, one or more prior object detections detected during the prior LiDAR sweep(s), and a time interval between the respective LiDAR sweeps. Thus, the current object detection may have more than one estimated velocity based upon one or more prior object detections in the prior sweep(s) to which the current detection may be compared. Between the location of the current object detection and a location of a prior object detection, a distance traversed may be calculated (based upon a physical distance between these two locations). A coordinate conversion—e.g., to a current coordinate system of a current frame—may also be applied so that the distance traversed accounts for ego-motion (e.g., motion of the ego-machine between successive LiDAR sweeps) of the LiDAR sensor between the sweeps. The distance traversed may then be divided by an elapsed time between the current object detection and the prior object detection, based upon the time interval between sweeps of the LiDAR sensor, to calculate the estimated velocity. The estimated velocity may include a magnitude component and/or a direction component.

In embodiments of the present disclosure, the system may compare each estimated velocity to a corresponding prior object detection for that estimated velocity. For example, each previous object detection may have the velocity tracked state (or more generally a tracked object state) indicative of the estimated velocity, if any, of that previous object detection which is refined over time. The comparison may be between a first object boundary from the prior sweep and a second object boundary of the current sweep. The comparison may be executed using an iterative closest point (ICP) algorithm that may provide a discrete comparison point for the LiDAR data corresponding to the respective object boundaries. The system may then use the probability distribution function ("PDF") for the object as determined from the tracked state to determine a likelihood that the estimated velocity corresponds with the respective previously detected object.

In embodiments of the present disclosure, the system may determine, based at least in part on the comparisons of each estimated velocity with their corresponding previously detected object, that one of the previously detected objects has a highest probability of corresponding to the current object. Initially, to reduce compute and runtime, the system may determine a minimum threshold for comparison—e.g., using a Mahalanobis distance. For example, if the estimated velocity is over the minimum threshold with respect to a PDF for a particular object(s), the system may remove the particular object(s) from consideration. For the remaining object(s), the estimated velocity(ies) may be compared to the PDFs using a cost function that represents the likelihood that the currently detected object corresponds to one or more of the previously detected objects. The system may then evaluate the cost functions and determine which object—if any— to associate the current velocity with to update the tracked state corresponding to the associated object.

In embodiments of the present disclosure, the system may update the tracked object state corresponding to the previous object detection that has the highest probability of corresponding to the current object detection to generate an updated tracked object state. For example, the current estimated velocity may be applied to the tracked object state, and a Kalman filter may be used to update the tracked object state using the estimated velocity. This updated tracked object state may then be the basis of comparison during subsequent LiDAR sweeps, so as to continue to refine the tracked object state through use of the Kalman filter over time. Thus, the LiDAR data may be used to directly to identify velocity information corresponding to objects or obstacles in the environment, which may allow for the LiDAR data alone to be directly applied to control decisions for the ego-machine.

With reference to FIG. 1A, FIG. 1A is an example object tracking system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. For example, in some embodiments, the system 100 may include similar features, functionality, and/or components to those of example autonomous vehicle 500 of FIGS. 5A-5D, example computing device 600 of FIG. 6, and/or example data center 700 of FIG. 7.

The system 100 may be, be a component of, or be otherwise associated with any of various systems. For example, the system 100 may include or correspond to a control system for an autonomous or semi-autonomous machine, a perception system for an autonomous or semi-autonomous machine, a system for performing simulation operations, a system for performing deep learning operations, a system implemented using an edge device, a system implemented using a robot, a system incorporating one or more virtual machines (VMs), a system implemented at least partially in a data center, and/or a system implemented at least partially using cloud computing resources.

As shown in FIG. 1A, the system 100 may include one or more depth perception sensors 102 (such as a LiDAR sensor, a RADAR sensor, an ultrasonic sensor, etc.). The depth perception sensor(s) 102 may generally include a transmitter and a receiver, and may include any suitable field of view or sensory field—such as a wide field of view (e.g., 180 degrees up to 360 degrees)—and may move (e.g., rotate), in embodiments, so as to gain a view of a larger area relative to the depth perception sensor 102. The—e.g., LiDAR—signals may reflect off objects in the vicinity of the depth perception sensor 102. The objects may be moving relative to the depth perception sensor 102, and the depth perception sensor 102 may be moving relative to an underlying surface (such as a road upon which the autonomous vehicle 500 is driving). The receiver may receive an indication (directly or indirectly) of these various reflected signals, and the indication may be stored and/or transmitted as data for later analysis.

The depth perception sensor 102 may have a sensor controller 104 that may be used to control the operation of the depth perception sensor 102 and interpret the results. For example, the sensor controller 104, or other processor, may receive the sensor data 106, and process, analyze, or otherwise perform calculations related to the sensor data 106. In some embodiments, the depth perception sensor 102 and/or sensor controller 104 may be similar to the LiDAR sensor 564 described with respect to FIGS. 5A-5C, or may be another type of depth perception sensor 102.

Figure 5A:
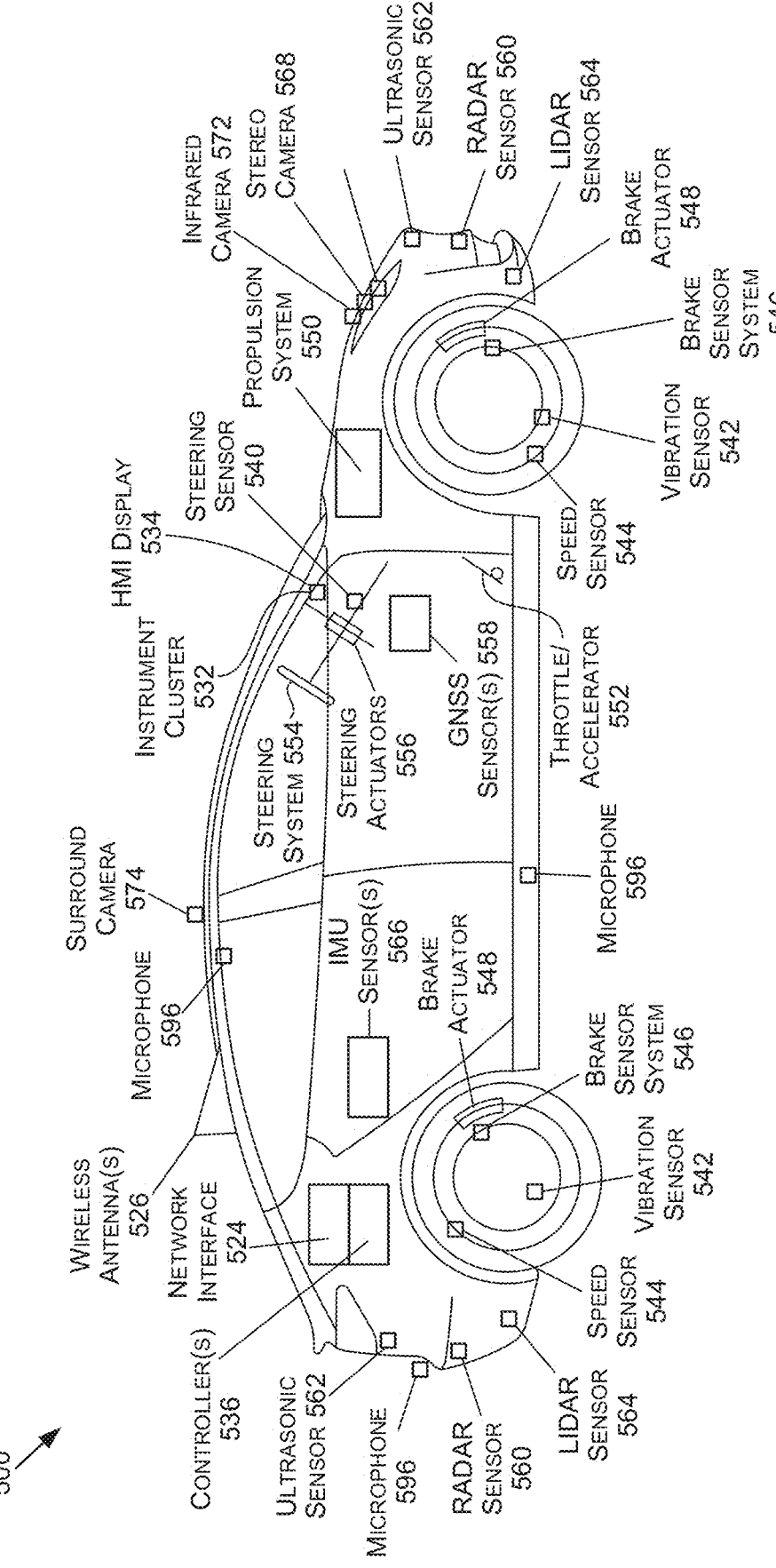
FIG. 5A is an illustration of an example autonomous vehicle, in accordance with some embodiments of the present disclosure.
Figure 5B:
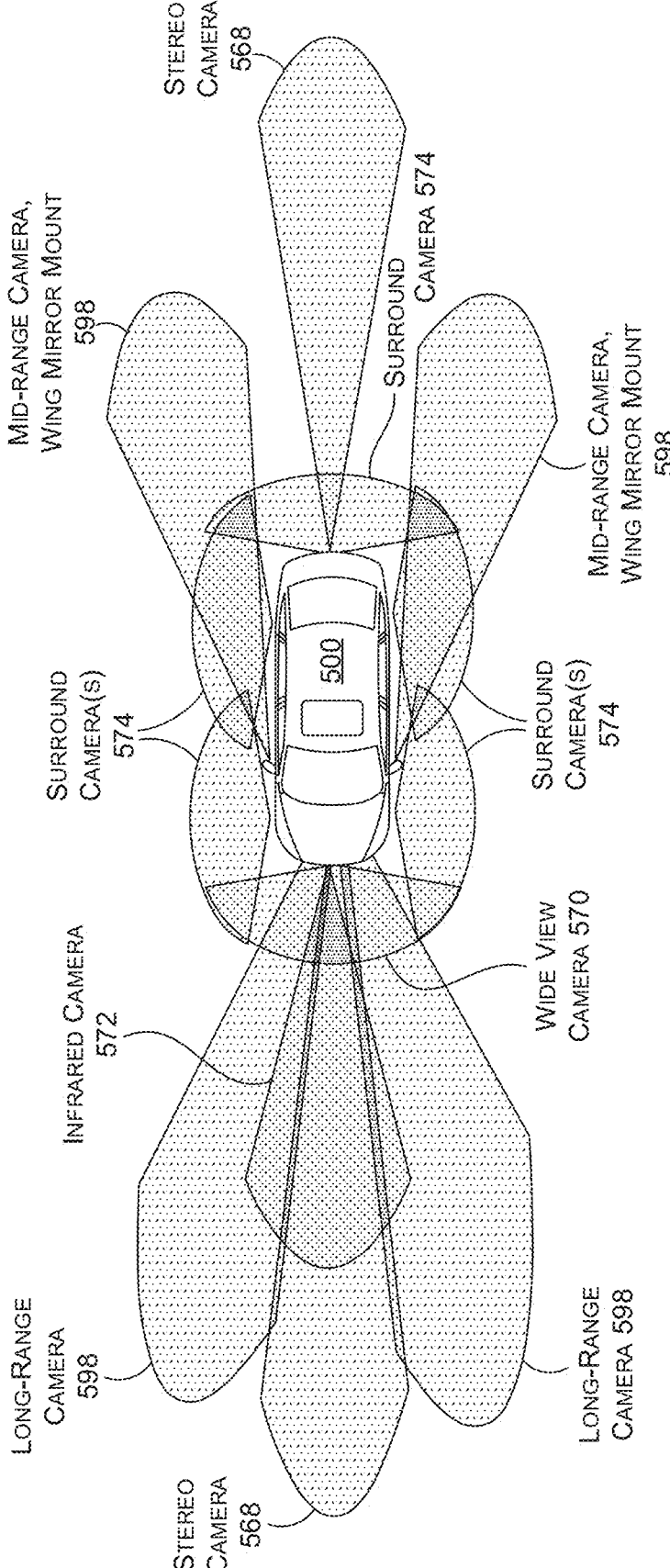
FIG. 5B is an example of camera locations and fields of view for the example autonomous vehicle of FIG. 5A, in accordance with some embodiments of the present disclosure.
Figure 5C:
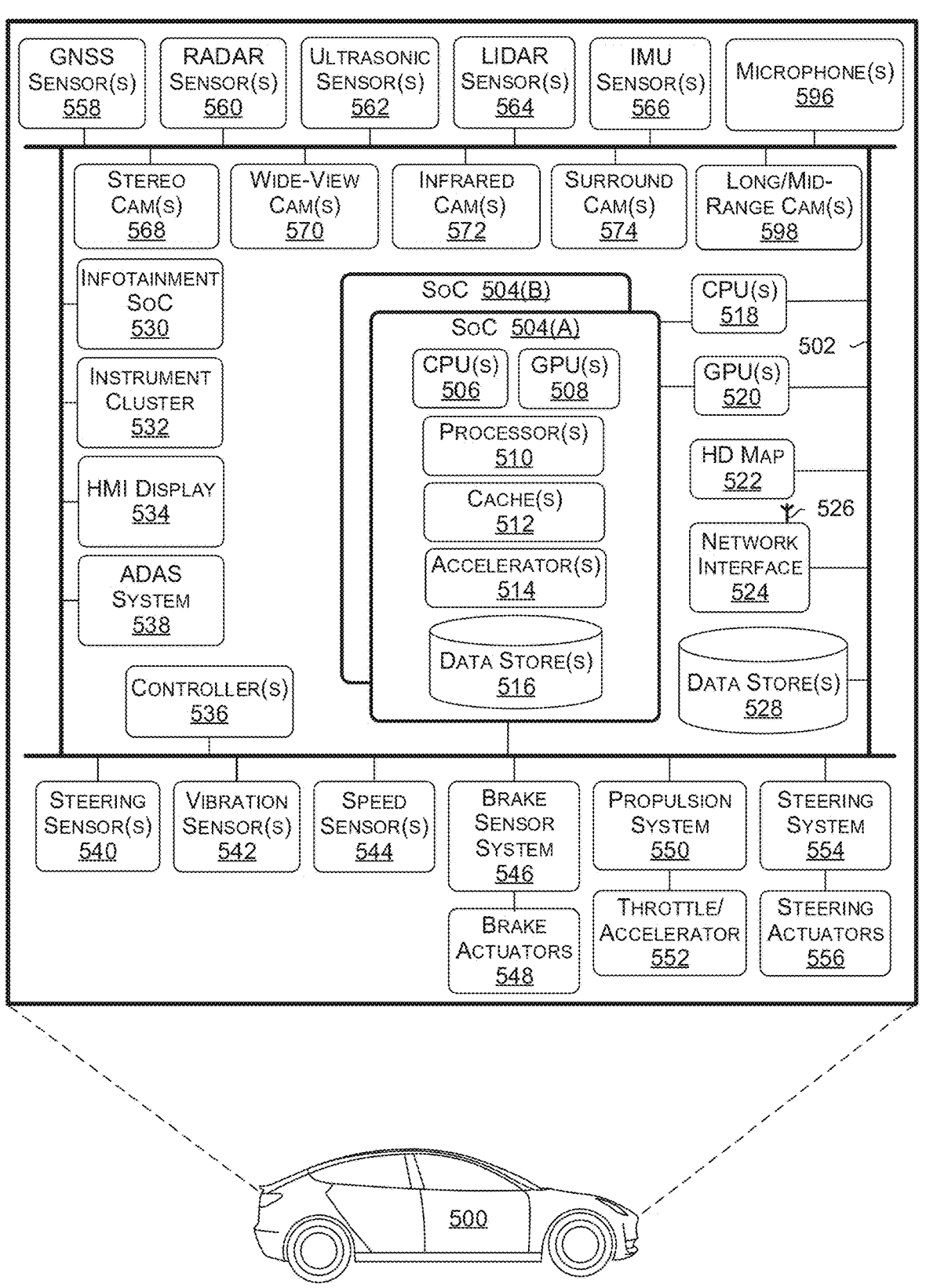
FIG. 5C is a block diagram of an example system architecture for the example autonomous vehicle of FIG. 5A, in accordance with some embodiments of the present disclosure.
Figure 6:
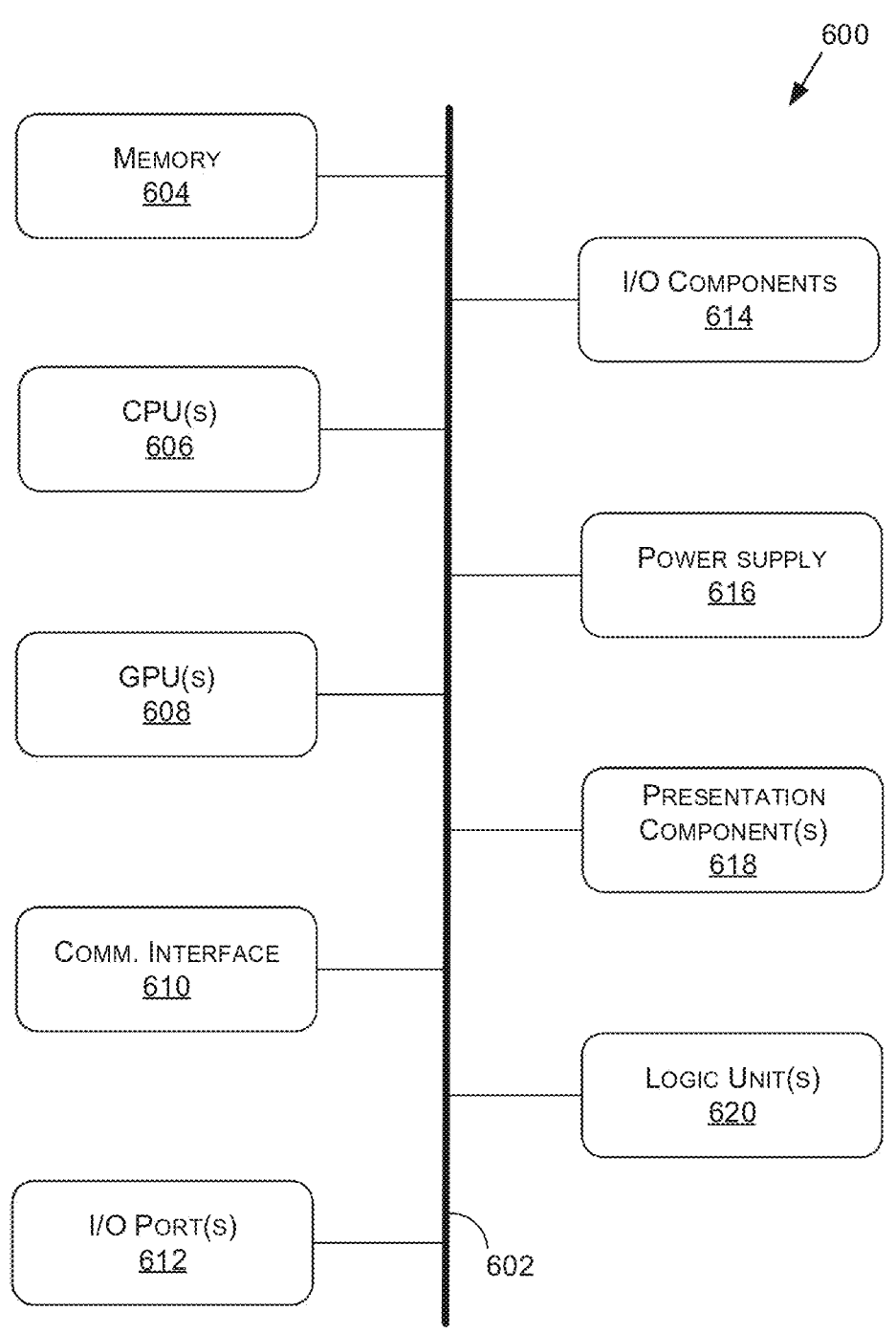
FIG. 6 is a block diagram of an example computing device suitable for use in implementing some embodiments of the present disclosure.

The sensor controller 104 may output sensor data 106 to a computing system 108, such as a computing system executing within vehicle 500 and/or example computing device 600 of FIG. 6. The sensor data 106 may be in any of various forms, such as, without limitation, a (2D or 3D) LiDAR point cloud, a projection or range image, and/or another sensor data representation. The sensor data 106 may be analyzed to perform various functions related thereto and may be used in conjunction with other sensor data 106 (such as the various sensors shown in FIGS. 5A-5C and discussed herein). In embodiments where a LiDAR sensor is used, the sensor data 106 may be referred to as LiDAR data; however, in other embodiments of the present disclosure the sensor data 106 may be another type of depth data (e.g., from RADAR, ultrasonic, etc.).

Figure 4:
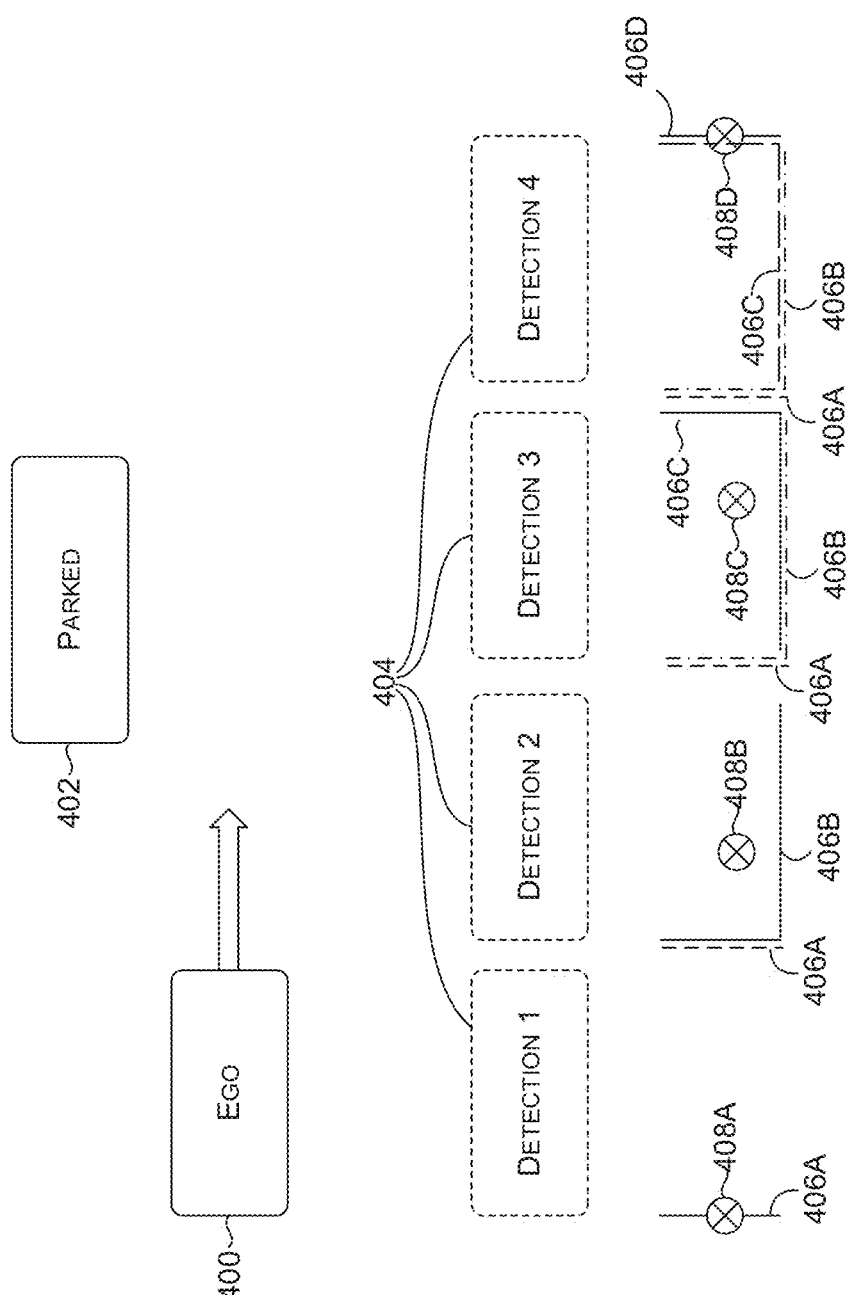
FIG. 4 is an illustration of an ego-vehicle passing a parked vehicle and how the parked vehicle is detected by the ego-vehicle, in accordance with some embodiments of the present disclosure.

The system 100 may include an object detector 110. The object detector 110 may analyze the set of LiDAR data to identify one or more obstacle boundaries. An obstacle boundary may be identified from the set of LiDAR data indicative of a physical obstacle in proximity of the depth perception sensor 102. The obstacle boundary may be indicative of a portion of the physical obstacle that is facing toward the depth perception sensor 102. In embodiments, a continuation of the obstacle boundaries and additional obstacle boundaries may be occluded from the depth perception sensor 102. Thus, as the machine 500 and/or the obstacles move relative to one another, existing obstacle boundaries may be extended (e.g., because additional portions of the physical obstacle are now visible, as shown in FIG. 4 and discussed herein) and new or updated obstacle boundaries may be created (e.g., because the corresponding physical obstacle is no longer occluded). Similarly, two or more obstacle boundaries may correspond to the same physical obstacle, for example due to an irregular shape of the physical obstacle.

Figure 2A:
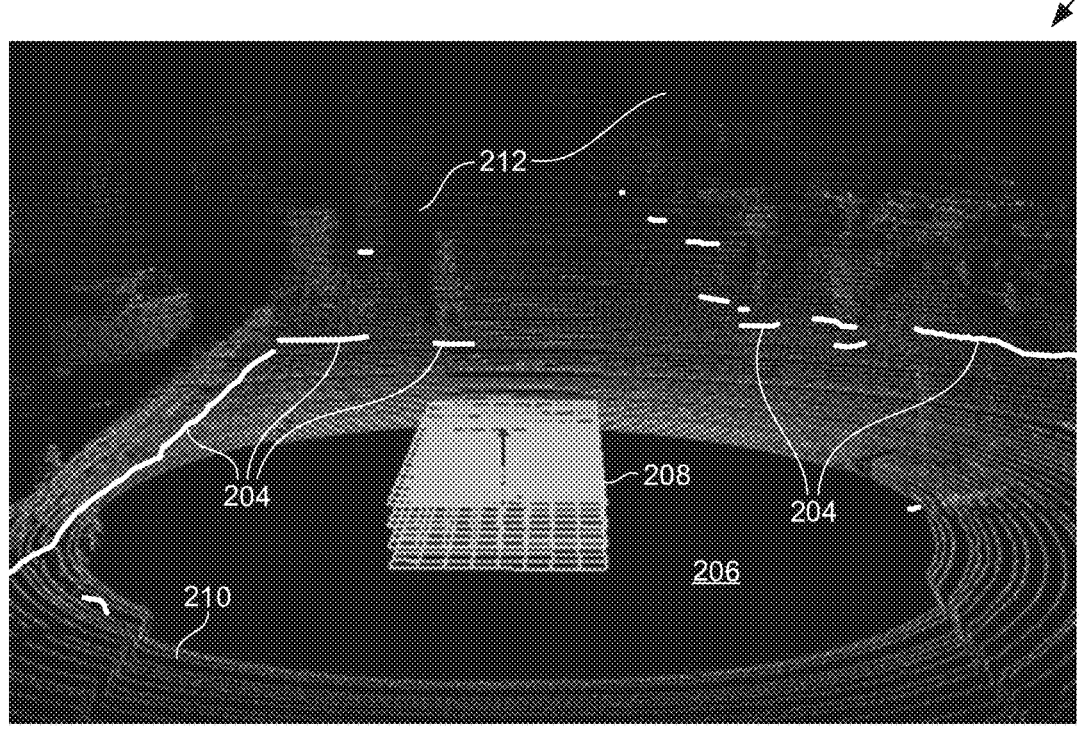
FIG. 2A is a graphical representation of a first set of LiDAR data at a time T1, showing objects for tracking, in accordance with some embodiments of the present disclosure.
Figure 2B:
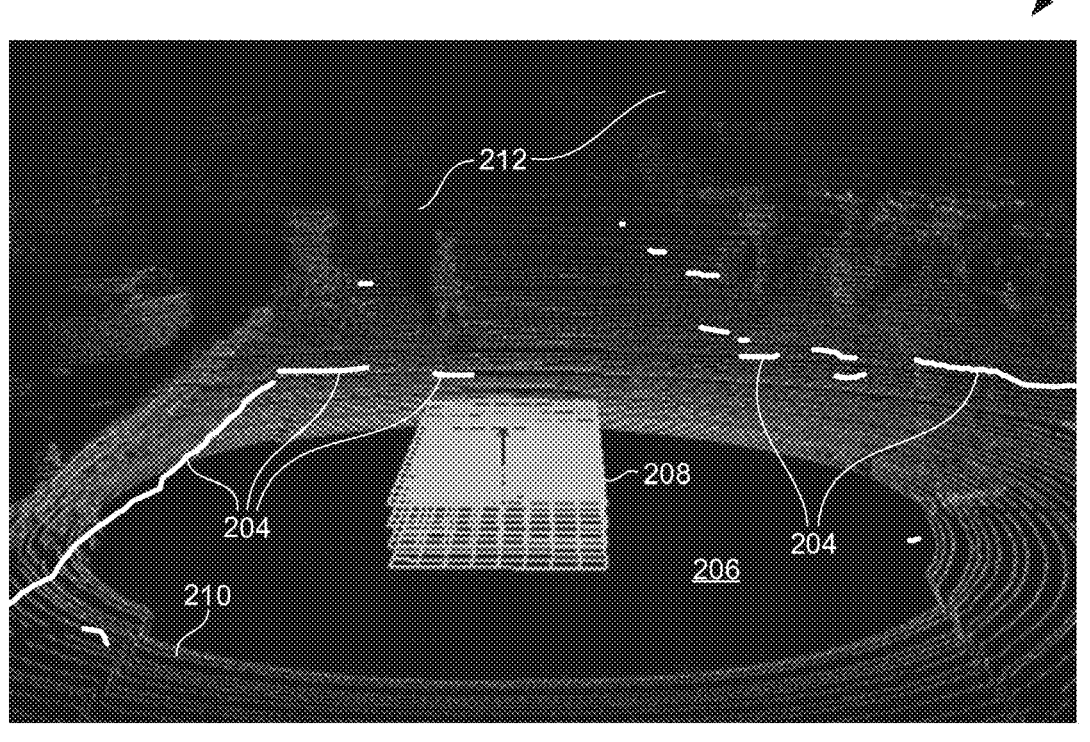
FIG. 2B is a graphical representation of a second set of LiDAR data at a time T2, subsequent to T1, showing an updated position of the objects for tracking, in accordance with some embodiments of the present disclosure.

An example of LiDAR data and identified obstacle boundaries are shown in FIGS. 2A and 2B. A first set of LiDAR data 200 in shown in FIG. 2A and a second set of LiDAR data 202 is shown in FIG. 2B. Obstacle boundary lines 204 are shown in FIGS. 2A-2B that correspond to the detected obstacle boundaries. FIGS. 2A-2B also include a central region 206 that is unpopulated and corresponds to a location of the depth perception sensor 102 (though not illustrated in FIG. 2A or FIG. 2B) as well as a radius extending therefrom. A machine representation 208 is disposed in the central region 206 to provide an approximate size and location of the machine (e.g., the vehicle 500) in relation to the obstacles for reference. Also shown are a series of concentric circles 210 that may indicate that information is available for this area but no obstacle is detected. Where obstacles are detected, there may be an obstruction in the concentric circles 210 and behind the obstacle boundary lines 204 (from the perspective of the depth perception sensor 102) there may be occluded regions 212 (indicated by blank white spaces). Occluded objects may become visible in additional iterations of the process, as the obstacles and/or the depth perception sensors 102 move relative to one another thereby removing the occlusions. The obstacle boundaries 204 in FIG. 2B have moved relative to the obstacle boundaries in FIG. 2A.

The system 100 may include a tracked state manager 112. The tracked state manager 112 may create and update various tracked states that are identified by the object detector 110. A tracked state may be indicative of an obstacle tracked over time between subsequent iterations of the methods described herein. The tracked state may be used to determine a speed and direction of the obstacle (relative to the machine, relative to the ground, or relative to some other reference frame).

Because the LiDAR data does not directly measure the speed and direction of the obstacle, embodiments of the present disclosure may use a Kalman filter to produce a refined estimate of the speed and direction of the obstacle, and may include other variables related to the obstacle. In some embodiments of the present disclosure, each of the one or more tracked object states are generated and/or refined using a Kalman filter.

A Kalman filter, which may also be known as a linear quadratic estimation (LQE), uses a set of imprecise and/or indirect measurements over time to produce an estimate of some unknown variable. In embodiments of the present disclosure, the unknown variable being estimated may be the velocity of the detected obstacle, which may include direction and/or speed information. A Kalman filter may include a prediction operation which may produce an estimate of the unknown variable based upon imprecise and/or indirect measurements. Secondly, upon a new set of imprecise and/or indirect measurements being received, the Kalman filter estimate may be updated. In embodiments, more weight may be given to data and/or estimates with higher certainty. The Kalman filter may include or be any of variations, such as an extended Kalman filter or an unscented Kalman filter.

The system 100 may include a velocity estimator 114. The velocity estimator may determine an estimated velocity for the object detected corresponding to one or more tracked states. The velocity estimator 114 may determine an estimated velocity for a newly detected obstacle boundary based upon a hypothetical correlation to one or more existing tracked states. The estimated velocity may include at least one of a magnitude or a direction component. In some instances, the determination of which (if any) of the tracked states corresponds to the current obstacle boundary may be based upon the magnitude component of the velocity, the direction component of the velocity, or both.

The velocity estimator 114 may determine the estimated velocity by comparing a current detection of the object determined using the one or more LiDAR sensors, a prior detection of the object or another object determined using the one or more LiDAR sensors, and an elapsed time between the current detection and the prior detection. The physical distance between the two locations of the respective detections divided by the elapsed time may give a magnitude and/or direction of the estimated velocity. The velocity estimator 114 may pass potential distances and/or estimated velocities through a gating function. The gating function may only allow additional calculations and/or considerations if the distance, velocity, or other attributes are below a certain threshold. The gating function may prevent unnecessary calculations related to potential matches that are unlikely to actually correlate. In other embodiments, the gating function may be applied after the estimated velocity is determined and before the comparison to determine correlation.

The velocity estimator 114 may include a coordinate converter. The coordinate converter may convert the one or more tracked object states to a coordinate system corresponding to the current detection of the object, wherein the comparing the estimated velocity to the one or more tracked object states is in the coordinate system. When comparing two—e.g., consecutive—frames (e.g., comparing two consecutive point clouds), one frame (e.g., the prior frame) may be transformed or rectified to a coordinate system of the subsequent or current frame (or vice versa), so as to compensate for ego-motion. By compensating for ego-motion, the analysis may only require accounting for movement of objects relative to the ego-vehicle because the motion of the ego-vehicle has been factored out—thereby allowing for alignment of the two frames (e.g., two LiDAR point clouds) in a same coordinate system.

Once an estimated velocity is determined, the tracked state manager 112 (or other component) may determine which of the tracked states corresponds to the current object boundary and accordingly update such tracked state with the new information using the Kalman filter. The tracked state manager 112 may compare the estimated velocity to one or more tracked object states corresponding to one or more previously detected objects.

Figure 3:
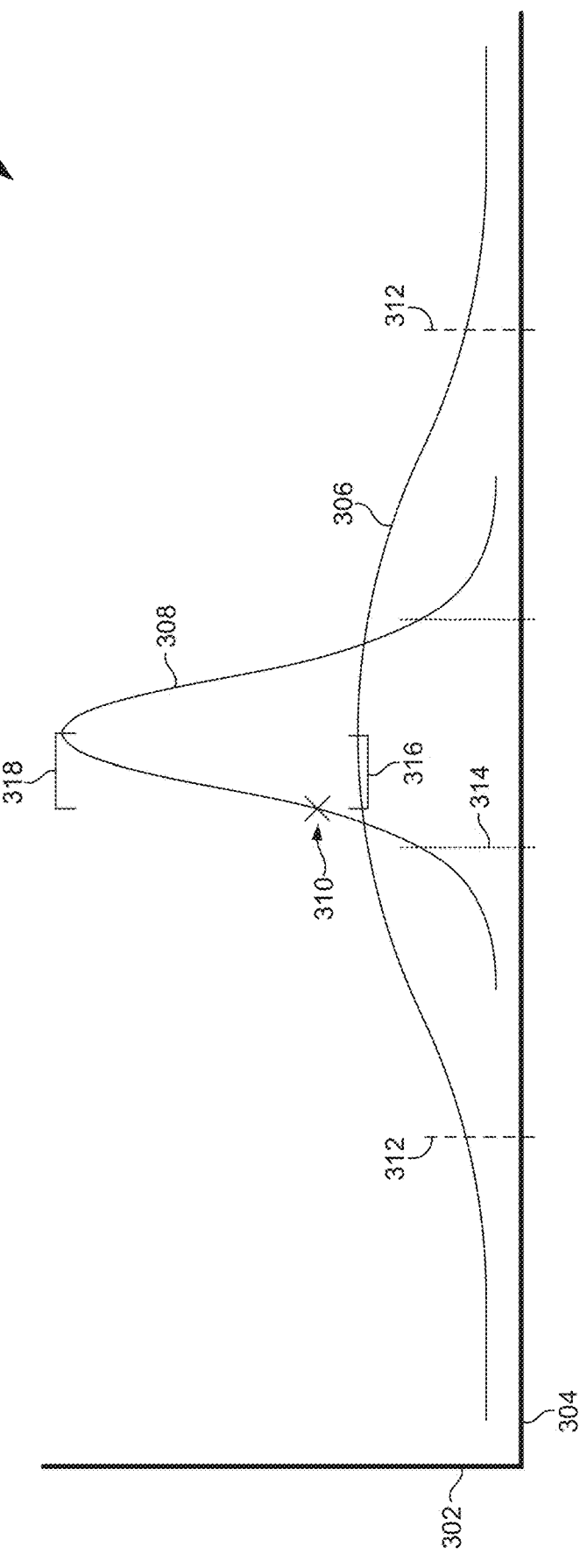
FIG. 3 is a graphical representation of a probability distribution corresponding to a velocity of a detected object, in accordance with some embodiments of the present disclosure.

Turning now to FIG. 3, the tracked state manager 112 may create and/or analyze a probability distribution corresponding to a velocity of a respective detected object of the previously detected objects. An example probability distribution diagram 300 is shown in FIG. 3. Generally, the probability distribution diagram 300 has a probability axis 302 (e.g., the weight of the distribution) and value axis 304. It should also be appreciated that some embodiments of the present disclosure may use a higher dimensional (e.g., 3D) consideration and that FIG. 3 is presenting a simplified probability distribution diagram 300 for ease of understanding of the reader.

A first probability distribution 306 and a second probability distribution 308 are shown on the probability distribution diagram 300. A measurement 310 is shown at a certain location relative to the first probability distribution 306 and the second probability distribution 308. Embodiments of the present disclosure determine which, if any, of the probability distributions 306, 308 are most likely to correspond with the measurement 310.

The first probability distribution 306 may have an associated first gating function 312. The relatively wide first probability distribution 306 may have a correspondingly wide gating function indicative that a wide variety of measurements may correspond to the first probability distribution. The second probability distribution 308 may have an associated second gating function 314. The relatively sharp second probability distribution 308 may have a correspondingly narrow gating function indicative that a narrow variety of measurements may correspond to the second probability distribution. As can be seen in the example of FIG. 3, the measurement 310 is within both the first gating function 312 and the second gating function 314. If the measurement 310 were outside one or more gating functions, the corresponding probability distributions may no longer be considered.

Since, in the example of FIG. 3, the measurement 310 passes (e.g., is inside) both gating functions 312, 314, the tracked state analyzer 112 (or other component) may determine a probability distribution (indicative of a previously detected object of a set of previously detected objects) that has the (or among the) highest probability of corresponding to the measurement 310 (indicative of the current obstacle boundary). The tracked state analyzer 112 may analyze a certain distance between the measurement 310 and the respective probability distributions 306, 308. In some embodiments of the present disclosure, the certain distance may be based upon the highest likelihood, which is represented by the height of the probability distribution relative to the measurement. Thus, since the measurement 310 is closest in likelihood to the second probability distribution 308 as shown, the tracked state analyzer 112 may select the second probability distribution as most likely to correspond with the measurement 310.

In other embodiments of the present disclosure, the certain distance may be a Mahalanobis distance as a cost function. However, the Mahalanobis distance may favor a wider probability distribution. This is because the Mahalanobis distance may be smaller for first probability distribution 306. Thus, in embodiments of the present disclosure, the Mahalanobis distance may be used for the gating function while the selection is based upon the likelihood (e.g., the vertical height of the respective probability distributions).

Once the corresponding tracked state is identified, the tracked state manager 112 (or other component) may update, using the estimated velocity, the tracked object state corresponding to the previously detected object that has the highest probability of corresponding to the object to generate an updated tracked object state. The updated tracked state may be referred to as a refined tracked state. The tracked state manager 112 may use a Kalman filter in creating the refined tracked state.

The system 100 may include a vehicle controller 116. With reference to FIG. 1A, the system 100 may include a vehicle controller 116 that may analyze the information in the tracked states to determine obstacles in the physical environment surrounding the depth perception sensor 102. The vehicle controller 116 may then instruct, or send information related to, one or more vehicle actions based upon the determined obstacle, such as actuating a brake or turning the vehicle. For example, the vehicle controller 116 may execute (or otherwise be associated with) an autonomous driving software stack that may include a perception layer, a world model management layer, a planning layer, a control layer, an actuation layer, an obstacle avoidance layer, and/or one or more other layers.

The system 100 may be associated with a computing system 600 in an autonomous vehicle 500, such as shown and described in regards to FIGS. 5A-5D, and 6. For example, an autonomous vehicle 500 that is operating autonomously may include a computer system 600 that is making numerous observations of surrounding obstacles and determining numerous actions for the vehicle 500 to perform to avoid those obstacles.

Figure 1B:
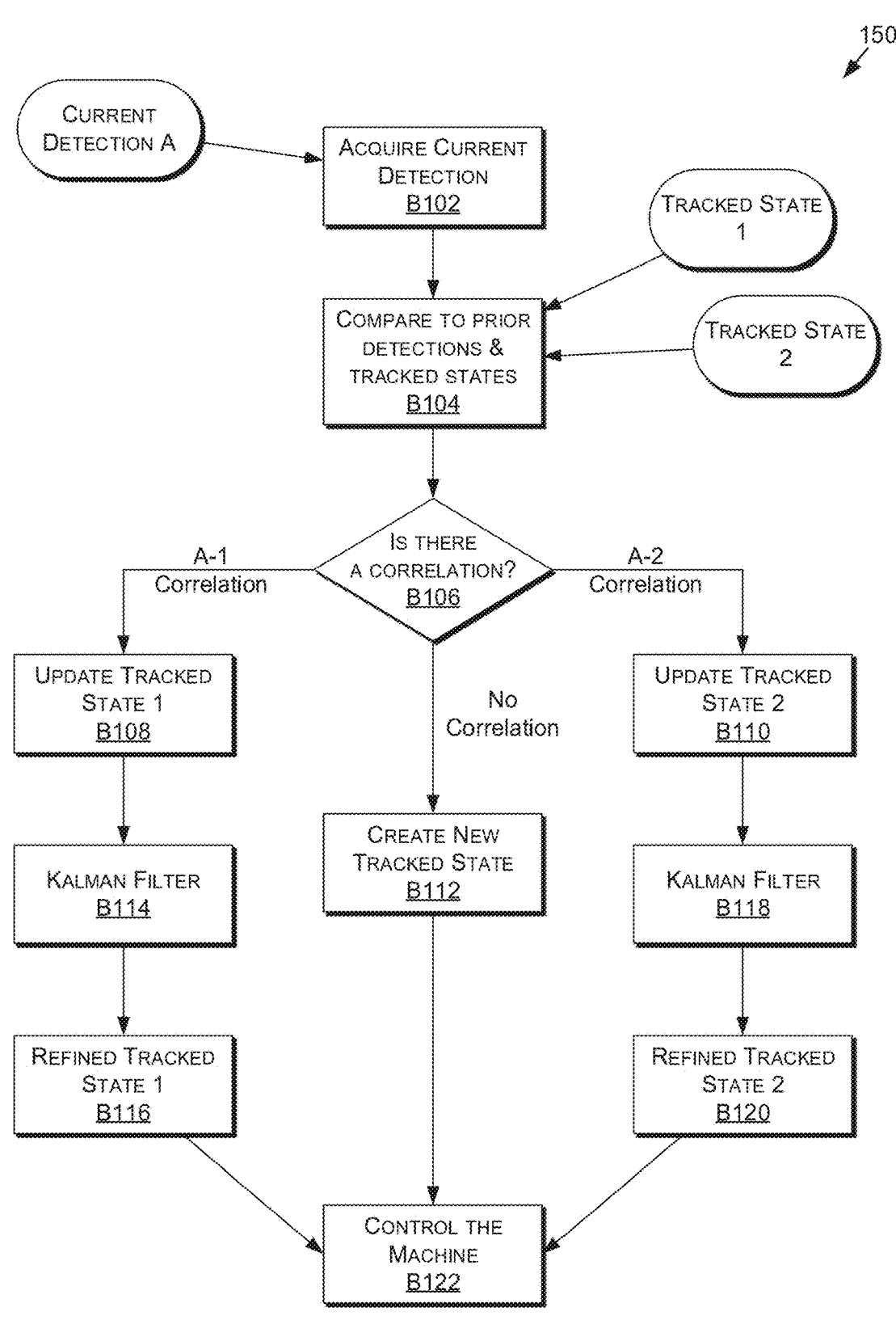
FIG. 1B is a time-flow diagram illustrating a process for object tracking, in accordance with some embodiments of the present disclosure.

Now referring to FIG. 1B, each block of method 150, described herein, may comprise a computing process that may be performed using any combination of hardware, firmware, and/or software. For instance, various functions may be carried out by a processor executing instructions stored in memory. The method 150 may also be embodied as computer-usable instructions stored on non-transitory computer storage media. The method 150 may be provided by a standalone application, a service or hosted service (standalone or in combination with another hosted service), or a plug-in to another product, to name a few. In addition, method 150 is described, by way of example, with respect to the system 100 of FIG. 1A and/or computer system 600 of FIG. 6. However, this method may additionally or alternatively be executed by any one system, or any combination of systems, including, but not limited to, those described herein.

FIG. 1B is a flow diagram showing a method 150 for detecting and tracking objects between subsequent sets of LiDAR data (or other depth perception data) and refining those detections over time, in accordance with some embodiments of the present disclosure. The method 150, at block B102, includes acquiring a current detection, such as from a depth perception sensor 102 and/or a sensor controller 104. The method 150, at block B102, may include determining one or more object boundaries from the LiDAR data, where the object boundaries may define one or more objects as detected in the LiDAR data, as shown in FIGS. 2A-B and discussed herein. A current detection (Current Detection A in FIG. 1B) may be received from the depth perception sensor 102 (such as a LiDAR sensor), where the current detection is indicative of a sweep or other capture of the depth perception sensor 102 at a certain time. The one or more object boundaries in the current detection may be associated with the certain time for the determination of estimated velocity.

The method 150, at block B104, includes comparing one or more object boundaries of the current detection to one or more prior detections and/or tracked states. A first tracked state (Tracked State 1 in FIG. 1B) and a second tracked state (Tracked State 2 in FIG. 1B) may each be considered relative to the object boundary of the current detection. The first tracked state and the second tracked state may be potential candidates for correlating to the object boundary of the current detection.

In embodiments of the present disclosure, the method 150, at block B104 includes comparing, using an iterative closest point (ICP) algorithm, the current obstacle boundary to a first obstacle boundary corresponding to the first tracked state to generate a first velocity estimate and to a second obstacle boundary corresponding to the second tracked state to generate a second velocity estimate. The iterative closest point algorithm may identify an offset vector such that the offset vector in combination with a first tracked state will align with the second tracked state. In embodiments, the ICP algorithm may compute the offset vector indicative of a magnitude and direction of the movement (if any) of the obstacle. Various distance and velocity measurements may be calculated based upon the offset vector.

An example of an ICP algorithm is shown graphically in FIG. 4, where an ego-vehicle 400 is moving relative to a parked vehicle 402. A series of four detections 404 (shown consecutively) are captured as the ego-vehicle 400 moves past the parked vehicle 402. A corresponding set of four obstacle boundaries 406A-D are detected. Detection 1 (taken when the ego-vehicle 400 is far from and approaching the parked vehicle 402) includes a first obstacle boundary 406A that is a straight line indicative of a first end of the parked vehicle 402. A centroid 408A of Detection 1 is in the center of this straight line. Detection 2 (taken when the ego-vehicle 400 is near and approaching the parked vehicle 402) includes a second obstacle boundary 406B that is an "L" shape, indicative of the portion of the parked vehicle 402 visible to the depth perception sensors 102 on the ego-vehicle 400. The centroid 408B of Detection 2 is at an average location of the "L" shape. The ICP algorithm may associate the first obstacle boundary 406A with the second obstacle boundary 406B to provide a more-complete obstacle boundary. Relative to Detection 2, the first obstacle boundary 406A is shown in broken line relative to the second obstacle boundary 406B. Detection 3 (taken when the ego-vehicle 400 is near and passing the parked vehicle 402) includes a third obstacle boundary 406C that is an "L" shape, indicative of the portion of the parked vehicle 402 visible to the depth perception sensor 102 of the ego-vehicle 400. The centroid 408C of Detection 3 is at an average location of the "L" shape. The ICP algorithm may associate the first obstacle boundary 406A and/or the second obstacle boundary 406B (or a combined obstacle boundary at least partially indicative of both the first obstacle boundary 406A and the second obstacle boundary 406B) with the third obstacle boundary 406C to provide a more-complete obstacle boundary. Detection 4 (taken when the ego-vehicle 400 is past the parked vehicle 402) includes a fourth obstacle boundary 406D that is a straight line indicative of a second end of the parked vehicle 402. A centroid 408D of Detection 4 is in the center of this straight line. The ICP algorithm may associate the first obstacle boundary 406A, the second obstacle boundary 406B, and/or the third obstacle boundary 406D (or a combined obstacle boundary at least partially indicative of some combination thereof) with the fourth obstacle boundary 406D to provide a more-complete obstacle boundary. It should be appreciated that Detections 3 and 4 are taken as the ego-vehicle 400 passes the parked vehicle 402 and include substantially mirrored obstacle boundaries (although this is for illustrative purposes only) of Detections 2 and 1, respectively. Typically, the respective detections will be made at a time interval, not at a relative position to any certain obstacle. FIG. 4 shows the respective detections for illustrative purposes only.

It should be appreciated that prior systems utilized only the centroid 408A-D for the determination of the location of the obstacle at each iteration (e.g., Detections 1-4). As can be seen in FIG. 4, the centroid 408A-D moves while the ego-vehicle 400 moves past the parked vehicle 402. This would generate a detected motion in prior art systems. The ICP algorithm reduces or eliminates the perceived motion of the parked vehicle 402 by comparing the respective obstacle boundaries 406A-D instead of relying on the centroids 408A-D. The ICP algorithm may be used to compute an offset vector to align two or more obstacle boundaries 406A-D. For the parked vehicle 402 of FIG. 4, the offset vector would be at or near zero, resulting in little to no detected movement of the parked vehicle. For a moving vehicle (not illustrated in FIG. 4), the translation vector would be indicative of a direction and magnitude of the movement of that vehicle. The magnitude of the movement may be determined based at least in part upon a translation of the obstacle between the two respective detections divided by a time interval between the detections. The direction of the offset vector may be determined at least in part upon a direction of the translation.

In embodiments of the present disclosure, the comparison between the current obstacle detection and the one or more prior detections is based at least in part on a similarity of a shape of the respective obstacles. This may be because the shape is unlikely to drastically change between single frames of the LiDAR data. The first obstacle boundary may include a first shape metric indicative of a first geometric shape, and the current obstacle boundary may include a second shape metric indicative of a second geometric shape. As such, the determination that the current obstacle boundary most closely corresponds to the first obstacle boundary may be further based at least in part on the first geometric shape and the second geometric shape.

The above-discussed comparisons of the first object boundary of the current detection and the second object boundary of the tracked state may be executed, at least in part, using an ICP algorithm. While the ICP location change is drastic in the example of FIG. 4, in embodiments of the present disclosure, the successive LiDAR data sets may be much closer together. As such, the difference in shapes of the obstacle boundaries 406A-D between two successive scans of the LiDAR data may be minimal and may provide an accurate measure of the movement of the physical object between the successive scans. It should be appreciated that in embodiments of the present disclosure, the ICP algorithm may account for or otherwise convert the one or more tracked object states to a coordinate system corresponding to the current detection of the object, and the comparing the estimated velocity to the one or more tracked object states may be in the updated coordinate system. This conversion to the updated coordinate system may be based on measured motion of an ego-machine 500 (e.g., ego-motion).

The method 150, at block B106, includes determining if there is a correlation between the current detection and any of the prior detections and/or tracked states. This operation may be performed by determining a cost function (or other probability distribution) associated with an estimated velocity for each potential correlation. An estimated velocity for the potential matches may be determined and then a cost function indicative of the likelihood of correlation may be calculated based at least in part of the estimated velocity.

The estimated velocity of an object may be determined based at least in part on a comparison between a current detection of the object determined using the one or more LiDAR sensors, a prior detection of the object or another object determined using the one or more LiDAR sensors, and an elapsed time between the current detection and the prior detection. The current detection of the object and the prior detection of the object may both use the ICP as the reference location, and the prior detection of the object may be adjusted by a coordinate conversion.

The method 150, at block B106, may further include comparing the estimated velocity to one or more tracked object states corresponding to one or more previously detected objects, each tracked object state of the one or more tracked object states representing a probability distribution corresponding to a velocity of a respective detected object of the previously detected objects. The probability distribution may be indicative of a likelihood that the estimated velocity corresponds to that tracked object state. Based upon an analysis of the probability distribution, one of the previously detected objects may be identified as having the or among the highest probability of corresponding to the object.

The method 150, at block B106, may further include calculating cost functions that correspond to the probability distributions. In the example of FIG. 1B, the Current Detection A is compared to Tracked state 1 to create a first probability distribution and compared to Tracked state 2 to create a second probability distribution. The cost functions may be based at least in part on the corresponding probability distributions as shown in FIG. 3. A first cost function may be calculated using the first probability distribution and the first velocity estimate. A second cost function may be calculated using the second probability distribution and the second velocity estimate.

The cost functions may be evaluated to determine which, if any, is most likely to correspond with the current obstacle boundary. Typically, a lower cost function is indicative of a higher likelihood of correlation. The method 150, at block B106, may further include determining, based on the first cost function being less than the second cost function, that the current obstacle boundary most closely corresponds to the first obstacle boundary.

Upon finding a correlation with the first tracked state, the method 150, at block B108, includes updating the first tracked state. Alternatively, upon finding a correlation with the second tracked state, the method 150, at block B110, includes updating the second tracked state. The respective updated tracked state may include information for the previous obstacle boundaries as well as the current obstacle boundary, which was found to correspond to the respective tracked state.

Upon finding no correlation, the method 150, at block B112, includes creating a new tracked state for the object. If no correlation with a prior tracked state is found, the newly discovered object may be entering the field of view from distance or from behind an occlusion. The new tracked state may then be used for future comparisons to determine if subsequent current obstacle boundaries correspond with the new tracked state. As such, the new tracked state may be refined in subsequent sweeps of the depth perception sensor 102.

The method 150, at block B114 following from block B108, includes applying a Kalman filter to the first tracked state. The method 150, at block B116 includes creating a refined first tracked state. The refined tracked state may be created through the application of the Kalman filter to add additional information to the tracked state. The refined tracked state may be indicative (directly or indirectly) of the current obstacle detection in addition to one or more prior obstacle detection for the same physical obstacle. Similarly, the method 150, at block B118 following from block B110, includes applying a Kalman filter to the second tracked state. The method 150, at block B120, includes creating a refined second tracked state.

The method 150, at block B120, includes controlling the machine based at least in part on the refined and/or new tracked state. For example, the tracked state may be indicative of physical objects that may affect the autonomous vehicle 500 or other machine, either directly or indirectly. As such, obstacles may be in motion, such as other vehicles or pedestrians, or may be stationary, such as buildings and trees. The obstacles may have a position relative to the vehicle, a 3D motion vector (which may include an acceleration, rotation, or other motion indication), and a relative size (based upon how many pixels correspond with the obstacle). In some embodiments, based at least in part on the information about the obstacle, the system 100 may determine a likelihood that the obstacle may affect the vehicle, and the system may determine one or more remedial actions to be performed so as to avoid the obstacle. For example, the vehicle controller 118 may determine that the vehicle should brake, turn, or accelerate to avoid the obstacle. In instances where an obstacle cannot be avoided, the system 100 may determine that one or more remedial actions should be taken, such as minimizing damage or activating other safety features. The controlling of block B120 may be performed to avoid the obstacles identified by taking one or more remedial actions. The controlling the vehicle may include sending a command to any of numerous vehicle systems, such as those described with respect to FIGS. 5A-5D.
Example Autonomous Vehicle FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope (s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or may make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power, each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN may seek to detect European sirens, and when in the United States the CNN may seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (I)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device

600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
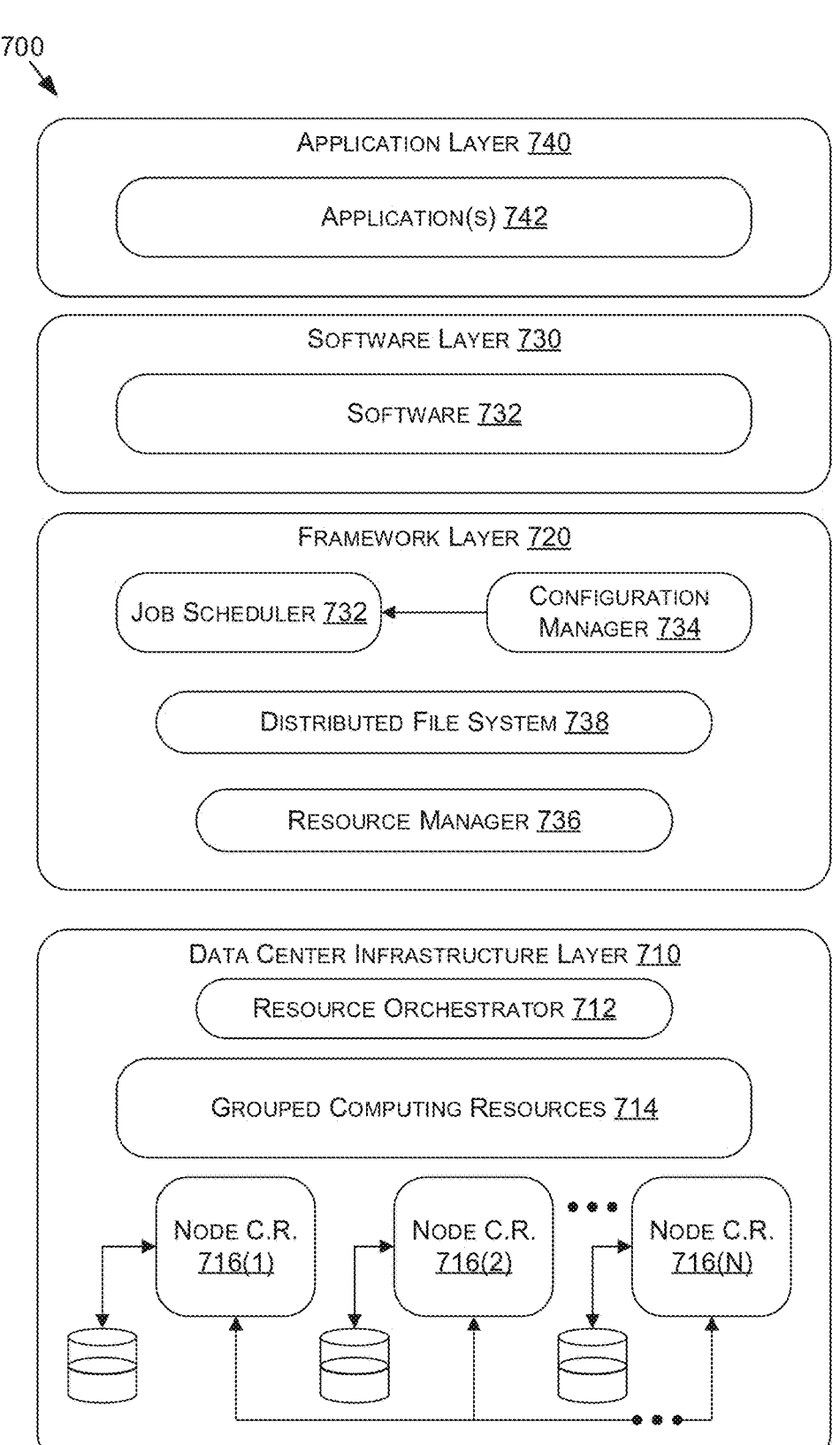
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more LiDAR sensors; and
one or more processing units to:
   determine, based at least on a change in position of an object between at least a current frame of LiDAR data and one or more previous frames of LiDAR data, an estimated velocity of the object;
   compare the estimated velocity to one or more tracked object states indicative of, at least, one or more velocities of one or more previously detected objects of a plurality of previously detected objects;
   determine, based at least on the comparison, a previously detected object of the plurality of previously detected objects associated with a highest probability of corresponding to the object;
   predict, using a Kalman filter, a tracked object state corresponding to the previously detected object that has the highest probability of corresponding to the object;

update, using the estimated velocity, the tracked object state to generate an updated tracked object state; and
   cause, based at least on the updated tracked object state, a machine to perform one or more control operations.

2. The system of claim 1, the one or more processing units further to:
   compare, using an iterative closest point (ICP) algorithm, a first object boundary corresponding to the object and a second object boundary corresponding to the previously detected object,
   wherein the determination of the estimated velocity of the object is further based at least on the comparison.

3. The system of claim 1, wherein the estimated velocity includes at least one of a magnitude or a direction.

4. The system of claim 1, wherein the one or more tracked object states are generated using the Kalman filter.

5. The system of claim 1, the one or more processing units further to convert the one or more tracked object states to a coordinate system corresponding to a current detection of the object made using the current LiDAR frame, wherein the estimated velocity is compared to the one or more tracked object states in the coordinate system.

6. The system of claim 5, wherein the conversion is based at least on a measured motion of the machine.

7. The system of claim 1, the one or more processing units further to filter a plurality of tracked object states using a Mahalanobis distance to determine the one or more tracked object states.

8. The system of claim 1, wherein the system is comprised in at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more virtual machines (VMs);
   a system implemented at least partially in a data center; or
   a system implemented at least partially using cloud computing resources.

9. A processor comprising:
processing circuitry to:
   maintain, using one or more Kalman filters, tracked states associated with a plurality of objects, the tracked states representative of probability distributions for velocities of the plurality of objects;
   determine, based at least on LiDAR data generated using one or more LiDAR sensors of a machine, a current position of a detected obstacle boundary corresponding to an object;
   select a subset of the plurality of objects based at least on a similarity between a first geometric shape corresponding to the detected obstacle boundary and one or more second geometric shapes corresponding to one or more tracked obstacle boundaries associated with the subset of the plurality of objects;
   compute, based at least on one or more displacements between the current position of the detected obstacle boundary and one or more previous positions of tracked obstacle boundaries corresponding to the subset of the plurality of objects, one or more estimated velocities of the object;

associate, based at least on comparing the one or more estimated velocities with one or more of the probability distributions corresponding to the subset of the objects, the object with a particular object from among the plurality of objects;

update, based at least on the association, a tracked state associated with the particular object; and cause an ego-machine to perform one or more operations based at least on the updated tracked state.

10. The processor of claim 9, the processing circuitry further to convert the one or more previous positions of the tracked obstacle boundaries corresponding to the subset of the objects to a coordinate system corresponding to a current detection to account for ego-motion of the ego-machine.

11. The processor of claim 9, the processing circuitry further to execute a gating function using a Mahalanobis distance to filter out a second subset of the plurality of tracked states that is different than the subset of the tracked states.

12. The processor of claim 9, wherein the processor is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

13. A method comprising:

determining an estimated velocity of an object based at least on a change in position of the object over a period of time, the change in the position of the object determined using at least first LiDAR data indicative of a current position of the object and second LiDAR data indicative of one or more previous positions of the object;

comparing the estimated velocity to tracked object states corresponding to previously detected objects, the tracked object states representing probability distributions corresponding to velocities of the previously detected objects;

determining, based at least on the comparing, a previously detected object having a highest probability of corresponding to the object;

predicting, using a Kalman filter, a tracked object state corresponding to the previously detected object;

updating, using the estimated velocity and based at least on the previously detected object having the highest probability of corresponding to the object, the tracked object state corresponding to the previously detected object; and causing a machine to perform one or more control operations based at least on the updating of the tracked object state.

14. The method of claim 13, wherein the estimated velocity includes at least one of a magnitude or a direction.

15. The method of claim 13, wherein one or more of the tracked object states are generated using a Kalman filter.

16. The method of claim 13, further comprising converting one or more of the tracked object states to a coordinate system corresponding to the first LiDAR data, wherein the comparing the estimated velocity to the one or more tracked object states is in the coordinate system.

17. The processor of claim 9, the processing circuitry further to:

determine the first geometric shape corresponding to the detected obstacle boundary; and determine, based at least on the selection of the subset of the plurality of object, the one or more displacements between the current position of the detected obstacle boundary and the one or more previous positions of the tracked obstacle boundaries.

18. The processor of claim 9, the processing circuitry further to:

compute, based at least on a displacement between the current position of the detected obstacle boundary and a previous position of a tracked obstacle boundary corresponding to the particular tracked object, an estimated velocity of the object; and compute a cost function based at least on a comparison of the estimated velocity with a probability distribution of velocity corresponding to the particular object, wherein the association of the object with the particular object is based at least on a value associated with the cost function being lower than a threshold.

19. The processor of claim 9, the processing circuitry further to:

predict, using one or more state transition models of the one or more Kalman filters, a next state associated with the particular objects based at least on the tracked state, wherein the updated tracked state comprises a refined version of the next state predicted using the one or more state transition models of the one or more Kalman filters.

20. The method of claim 13, further comprising:

selecting a subset of objects from among the previously detected objects based at least on a similarity between a first geometric shape corresponding to the object and one or more second geometric shapes corresponding to one or more of the previously detected objects being greater than a threshold, wherein the previously detected object having the highest probability of corresponding to the object is identified from among the subset of objects.

* * * * *